(12) United States Patent
Roach

(10) Patent No.: US 6,248,017 B1
(45) Date of Patent: Jun. 19, 2001

(54) HAND-HELD ELECTRONIC GAME WITH ROTATABLE DISPLAY

(75) Inventor: Alan P. Roach, Chelmsford, MA (US)

(73) Assignee: Hasbro, INC, Pawtucket, RI (US)

( * ) Notice: Subject to any disclaimer, the term of this patent is extended or adjusted under 35 U.S.C. 154(b) by 0 days.

(21) Appl. No.: 09/471,325

(22) Filed: Dec. 23, 1999

(51) Int. Cl.[7] ........................................ A63F 13/06
(52) U.S. Cl. ............................. 463/37; 463/1; 463/30
(58) Field of Search ........................ 463/1–6, 30, 36, 463/37, 46, 47

(56) References Cited

U.S. PATENT DOCUMENTS

| D. 399,886 | 10/1998 | Brase et al. . | |
|---|---|---|---|
| D. 412,722 | * 8/1999 | Bagley | D21/329 |
| 4,373,722 | 2/1983 | Kite et al. . | |
| 4,504,062 | 3/1985 | Smith, III et al. . | |
| 4,561,723 | * 12/1985 | Hamano et al. | 349/15 |
| 4,895,376 | 1/1990 | Chiang Shiung-Fei . | |
| 4,969,647 | 11/1990 | Mical et al. . | |
| 4,976,429 | * 12/1990 | Nagel | 463/34 |
| 5,649,862 | 7/1997 | Sakaguchi et al. . | |
| 5,685,776 | 11/1997 | Stambolic et al. . | |
| 5,795,227 | 8/1998 | Raviv et al. . | |

* cited by examiner

Primary Examiner—Mark Sager
Assistant Examiner—John M Hotaling, II
(74) Attorney, Agent, or Firm—Fish & Richardson P.C.

(57) ABSTRACT

An electronic game includes a housing shaped like a fighter ship, a display mounted on the housing, an input device mounted within the housing, and a processor connected to control the display and receive input from the input device. The display is rotatable relative to the housing. The processor is programmed to cause the display to display an element representing the fighter ship that remains stationary relative to the housing when a player rotates the display relative to the housing. The processor causes the display to display a play zone that includes the stationary element and one or more zone elements, the zone elements rotating as the player rotates the display. The zone elements include objects that move toward a perimeter of the play zone, fired objects. The fired objects may emanate from the perimeter-moving objects—these fired objects move toward the play zone perimeter. The fired objects may concurrently or alternatively emanate from the stationary element in response to signals from the input device. When a fired object strikes the stationary element, the stationary element is destroyed. When a fired object strikes a zone element, the zone element is destroyed.

23 Claims, 10 Drawing Sheets

HAND-HELD ELECTRONIC GAME WITH ROTATABLE DISPLAY

TECHNICAL FIELD

The invention relates to a hand-held electronic game.

BACKGROUND

A variety of hand-held electronic games are known. Typically, these games have a display and buttons that allow a player to manipulate the images on the display.

SUMMARY

A hand-held electronic fighter game includes a housing shaped like a fighter ship, a display mounted on top of the housing and viewable by a player, an input device mounted on a handle of the housing, and a processor connected to the display and the input device. The player holds, with one hand, the handle that protrudes from a front of the housing and concurrently rotates, with the other hand, the display. While the player holds the housing and rotates the display, a soft end of the housing rests on the player's chest, thus stabilizing the game. The display includes a game screen that includes an icon of the fighter ship and icons of various enemy ships. During game play, the player rotates the viewer to change the fighter ship's direction, avoids incoming fire from enemy ships, and fires shots at the enemy ships by activating the input device on the handle.

The invention provides an electronic game that includes a housing, a display mounted on the housing and rotatable relative to the housing, and a processor connected to control the display. The processor is programmed to cause the display to display an element that remains stationary relative to the housing when the display is rotated relative to the housing.

Embodiments may include one or more of the following features. For example, the housing may be shaped like a vehicle. The housing may include a handle that enables the player to hold the housing using one hand and rotate the display using the other hand. The display may include a liquid crystal display (LCD).

The housing may include an end that couples to the player's chest. The coupled end of the housing may include a softer material to protect the player's chest.

The processor may cause the display to display a play zone that includes the element. The play zone may include one or more zone elements that rotate as the display is rotated relative to the housing.

The zone elements may include objects that move toward a perimeter of the play zone, and fired objects. The game may include an input device that is mounted in the housing and coupled to a player's hand. The processor may be connected to the input device.

The fired objects may emanate from the perimeter-moving objects and move toward the play zone perimeter. When a fired object strikes the stationary element, the stationary element may be destroyed.

The game may further include a speaker connected to and controlled by the processor. The processor may be programmed to play one or more sounds from the speaker when the stationary element is destroyed. The processor may be programmed to alter the play zone when the stationary element is destroyed. The processor may be programmed to display a game update that provides game information to the player. The processor may be programmed to permit the game update to display a value associated with a number of destroyed stationary elements.

The fired objects may emanate from the stationary element in response to signals from the input device. When a fired object strikes a zone element, the zone element may be destroyed.

The game may include a speaker connected to and controlled by the processor. The processor may be programmed to play one or more sounds from the speaker when a zone element is destroyed. The game may also include a speaker connected to and controlled by the processor. The processor may be programmed to play one or more sounds from the speaker when a zone element is destroyed. The processor may be programmed to display a game update that displays a score associated with a number of destroyed zone elements.

Other features and advantages will be apparent from the following description, including the drawings, and from the claims.

DETAILED DESCRIPTION

Figure 1:
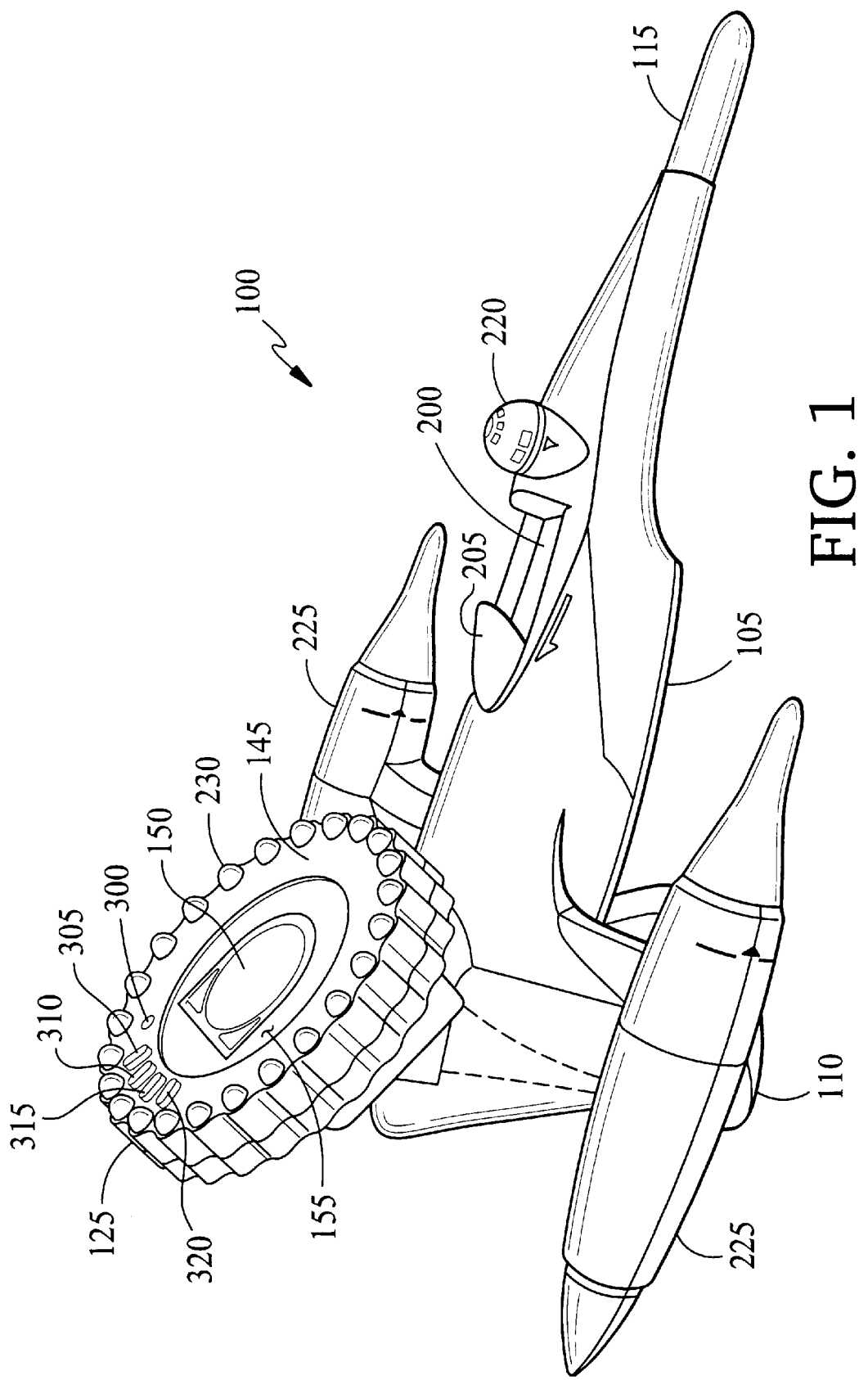
FIG. 1 is a perspective view of a hand-held electronic fighter game.
Figure 2:
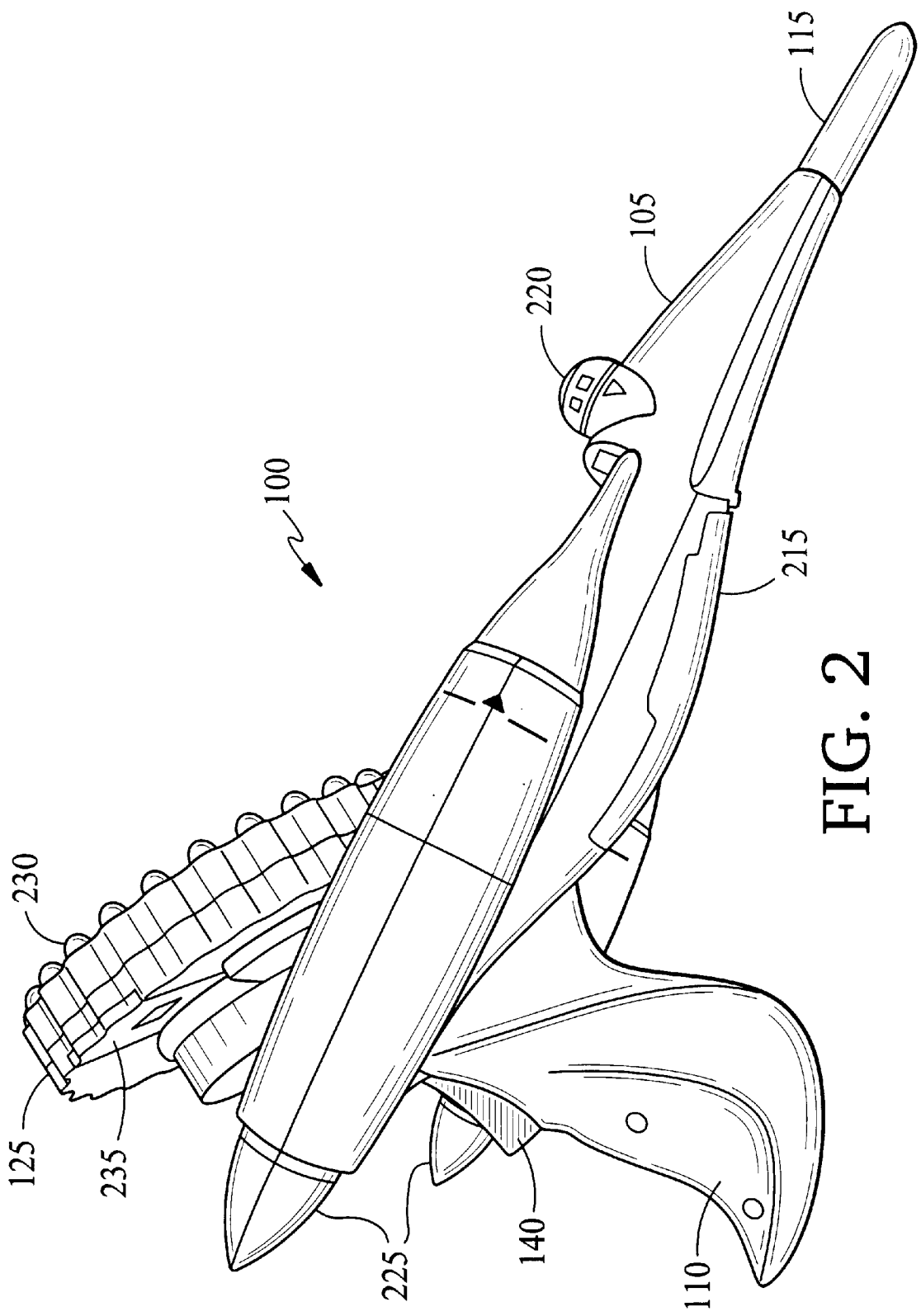
FIG. 2 is a side perspective view of the game of FIG. 1.
Figure 3:
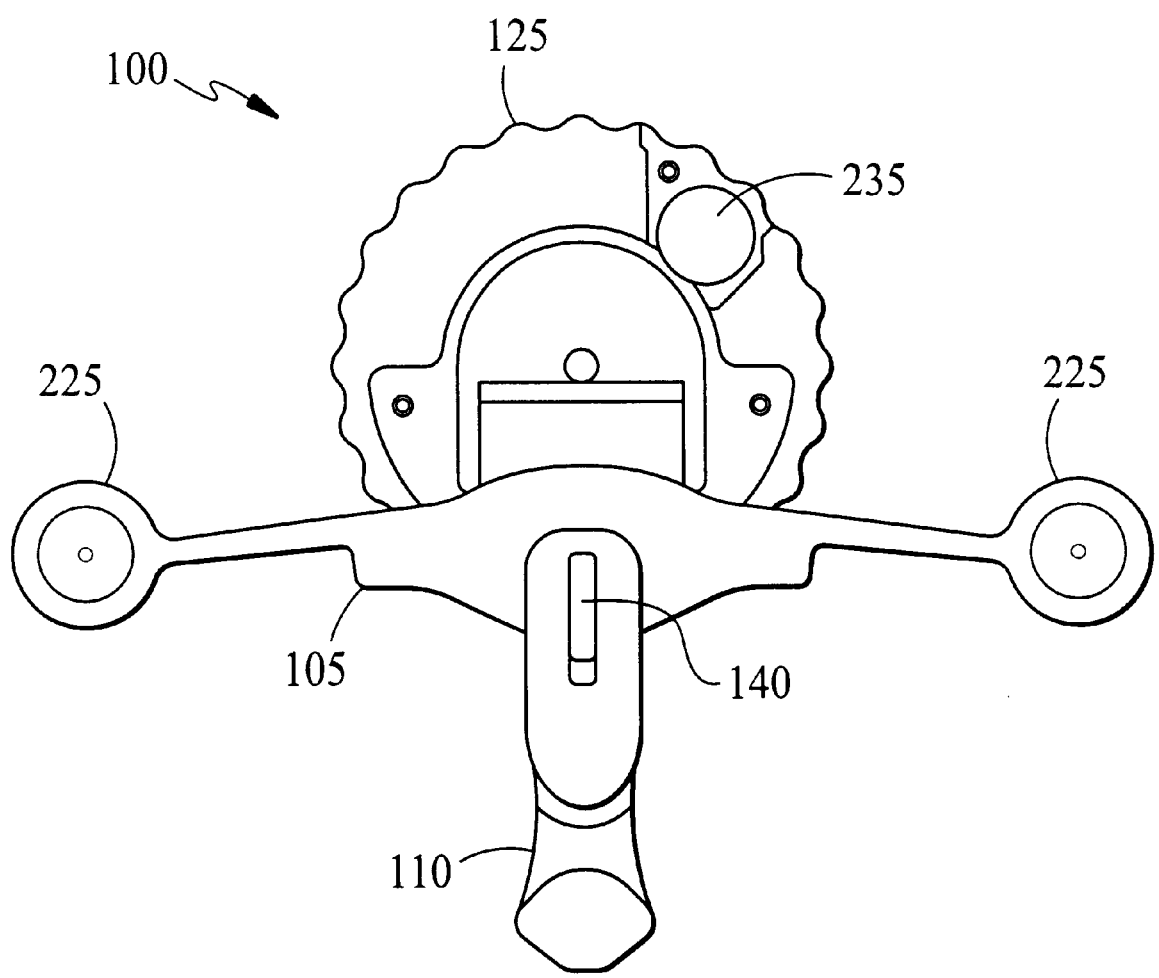
FIG. 3 is a front view of the game of FIG. 1.
Figure 4:
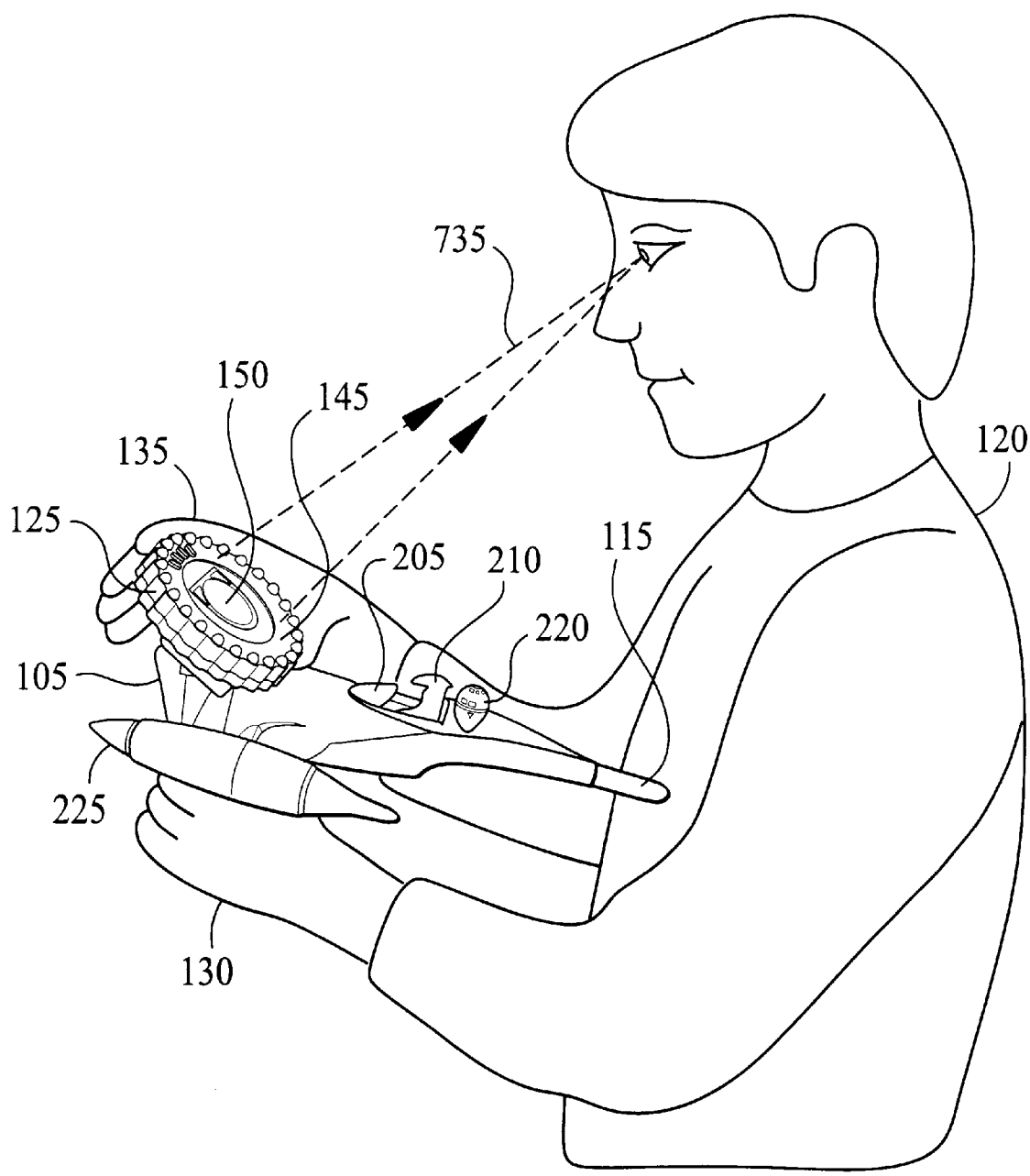
FIG. 4 is a side perspective view of a player holding the game of FIG. 1.

Referring to FIGS. 1–4, a hand-held electronic fighter game 100 includes a housing 105 in the shape of a fighter spaceship. The housing 105 may be made of a rigid plastic material and formed of either a single piece or several pieces that fit together to form a hollow volume to house, for example, one or more action figures.

The housing 105 includes a handle 110 that protrudes downward from the front of the spaceship to facilitate a player's grip on the game 100. The handle 110 is ergonomically designed to fit a player's hand so as to reduce player fatigue. The housing 105 includes a rear tip 115 made of a softer material, such as rubber. When the player 120 holds the game 100, the rear tip 115 rests on the player's chest to prevent the game 100 from tipping rearward or moving about while playing.

A rotatable viewer 125 is positioned atop the housing 105 at an angle that enables the player to clearly observe the viewer 125 during game play. The viewer 125 may be detachable from the housing and made of an outer plastic shell formed from two pieces to facilitate manufacture. The two pieces, when joined, form a cavity in which components of the game are housed. The viewer 125 is circular to ease manipulation of it. When the player holds the handle 110 with one hand, for example the left hand 130, and rests the rear tip 115 against his or her chest, the other hand, in this example the right hand 135, is free to rotate the viewer 125. Likewise, the player may grip the handle with his or her right hand, enabling the left hand to rotate the viewer 125.

Various buttons are placed on the game 100 to enable the player 120 to control the game 100. For example, a fire button 140 is formed on an outer edge of the handle 110. This arrangement enables the player 120 to hold the game 100 at the handle 110 and fire shots from a fighter displayed on the viewer 125 with a single hand (which is the left hand 130 in the example above). Several control buttons are formed on a top face 145 of the rotatable viewer 125. These control buttons are used by the player to, for example, start the game, control sound functions, and determine scores and skill levels.

The viewer 125 includes a liquid crystal display (LCD) screen 150 that is covered by a partially-transparent window 155. The LCD screen 150 is visible to the player holding the game 100 at the handle with the rear tip 115 resting on the player's chest. The LCD screen 150 displays a game screen (designed to simulate a view that a fighter pilot would see in outer space), a score update, and a game update.

Briefly, game play consists of rotating the viewer 125 to change the fighter ship's direction of travel and, correspondingly, the view presented on the display. The player's first goal is to avoid incoming fire from enemy ships. The player's second goal is to line up enemy ships in the fighter's sights and fire shots at the enemy ships to destroy them and collect points. The enemy ships enter the LCD screen 150 from different directions and fire at the fighter ship. The fighter ship is displayed as an icon on the LCD screen 150. When the player rotates the viewer 125, the icon remains stationary relative to, for example, the handle 115, so that it appears to the player that the fighter ship is rotating in the space displayed by the viewer 125.

The housing 105 further includes a cockpit 200 with a pilot shield 205. An action figure 210 (representing the pilot of the fighter ship) is inserted into the cockpit 200 through a cockpit hatch 215 located on the bottom of the housing 105. The cockpit hatch 215 is opened to insert the action figure 210 into the cockpit 200 and closed thereafter to prevent the action figure 210 from falling out of the cockpit 200. An additional action figure 220 may be placed behind the cockpit 200, the additional action figure 220 representing the pilot's assistant. The housing 105 also includes opposable wings 225 that extend from the front of the housing 105.

The rotatable viewer 125 may further include knobs 230 on the top face 145 that indicate the positions through which the viewer 125 is rotated. The viewer 125 rotates through any number of discrete positions. This number is limited by the size of the viewer 125 and the game controller capabilities, both of which affect the manufacturing cost and therefore the price of the game 100. In one implementation, the viewer 125 rotates through eleven positions.

A removable battery compartment cover 235 is formed in the viewer's bottom surface. The compartment cove 235 is secured to the viewer by removable screws.

To create a more realistic game atmosphere, the partially-transparent window 155 may be artistically rendered. For example, in the implementation in which the game 100 is a fighter ship flying through outer space, the window 155 may include around its edge a black background with stars. Similarly, if the game 100 were implemented as a water vehicle cruising underwater, the window 155 could include around its edge a blue-green background with fish. In any case, the window 155 is transparent in a center area to enable the player 120 to view the LCD screen 150.

On the top face 145 of the viewer 125 are the control buttons—reset 300, on 305, sound 310, game 315, and score 320. The player presses the reset button 300 to reset the game 100. The player presses the on button 305 to initially turn on the game, change a player's reward rating, and play again. The player presses the sound button 310 to alternately turn sound effects on and off. The player presses the game button 315 to start a new game at a lowest reward rating and easiest skill level. The player presses the score button 320 to display a saved best score.

Figure 5:
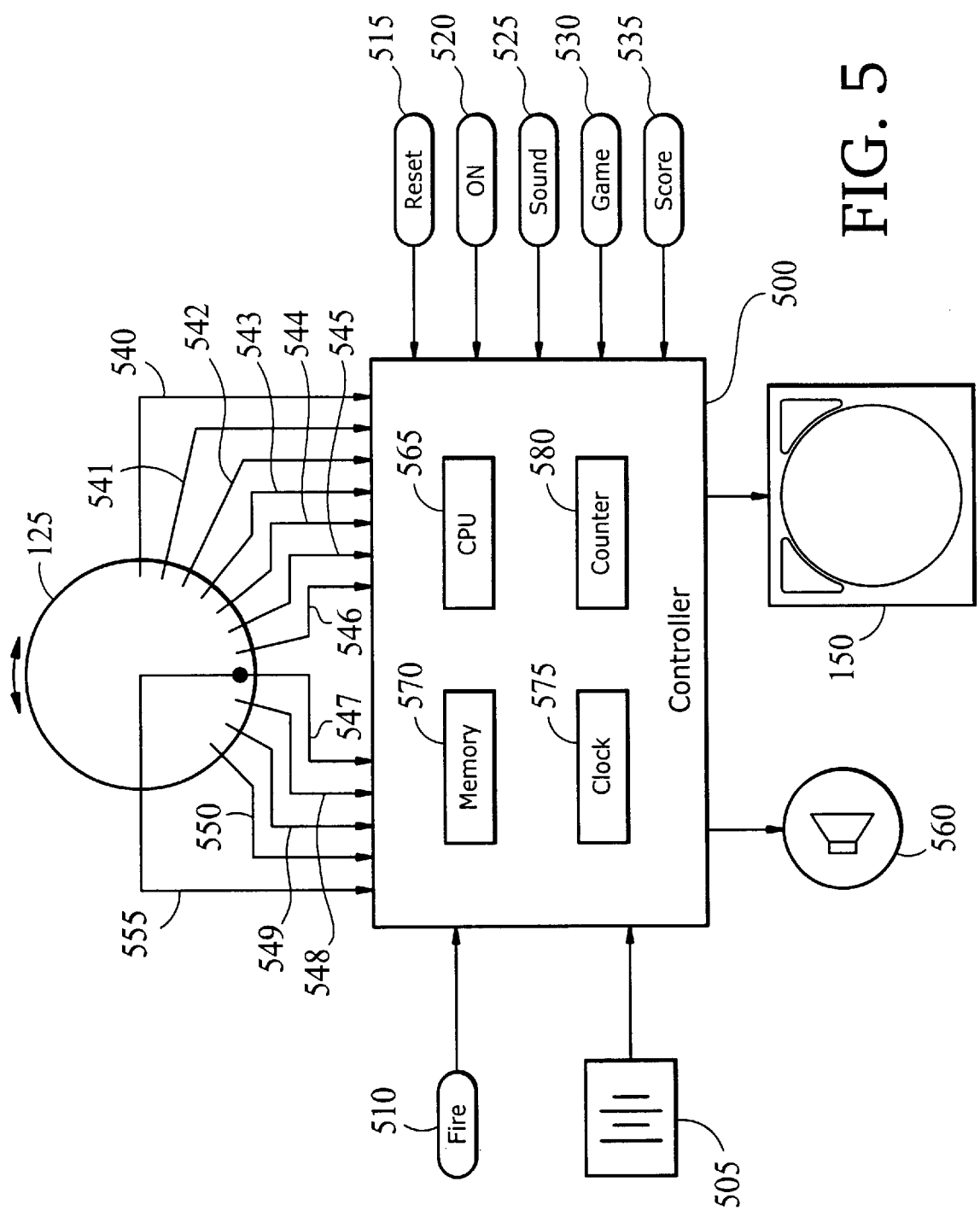
FIG. 5 is a block diagram of operating components of the game of FIG. 1.

Referring also to FIG. 5, the game 100 contains within the viewer 125 an electronic controller 500 which connects to and controls other game components. An electrical power source 505 for the controller (for example, a battery) is contained within the viewer and securely held by the battery compartment cover 235. Switches 510–535, which connect, respectively, to the control buttons 140 and 300–320, inputs from the player to the controller 500. Rotatable switches 540–550, corresponding to each viewer position, provide input to the controller 500 via a lead 555 connected to and stationary with the housing 105.

Using input from the switches 510–550, the controller 500 controls the image displayed on the LCD screen 150. As game play requires, the controller 500 also may send an audio signal to a speaker 560 contained by the viewer cavity. The controller 500 performs these tasks using additional information obtained from a processor 565, memory 570, a clock 575, and a counter 580.

Figure 6:
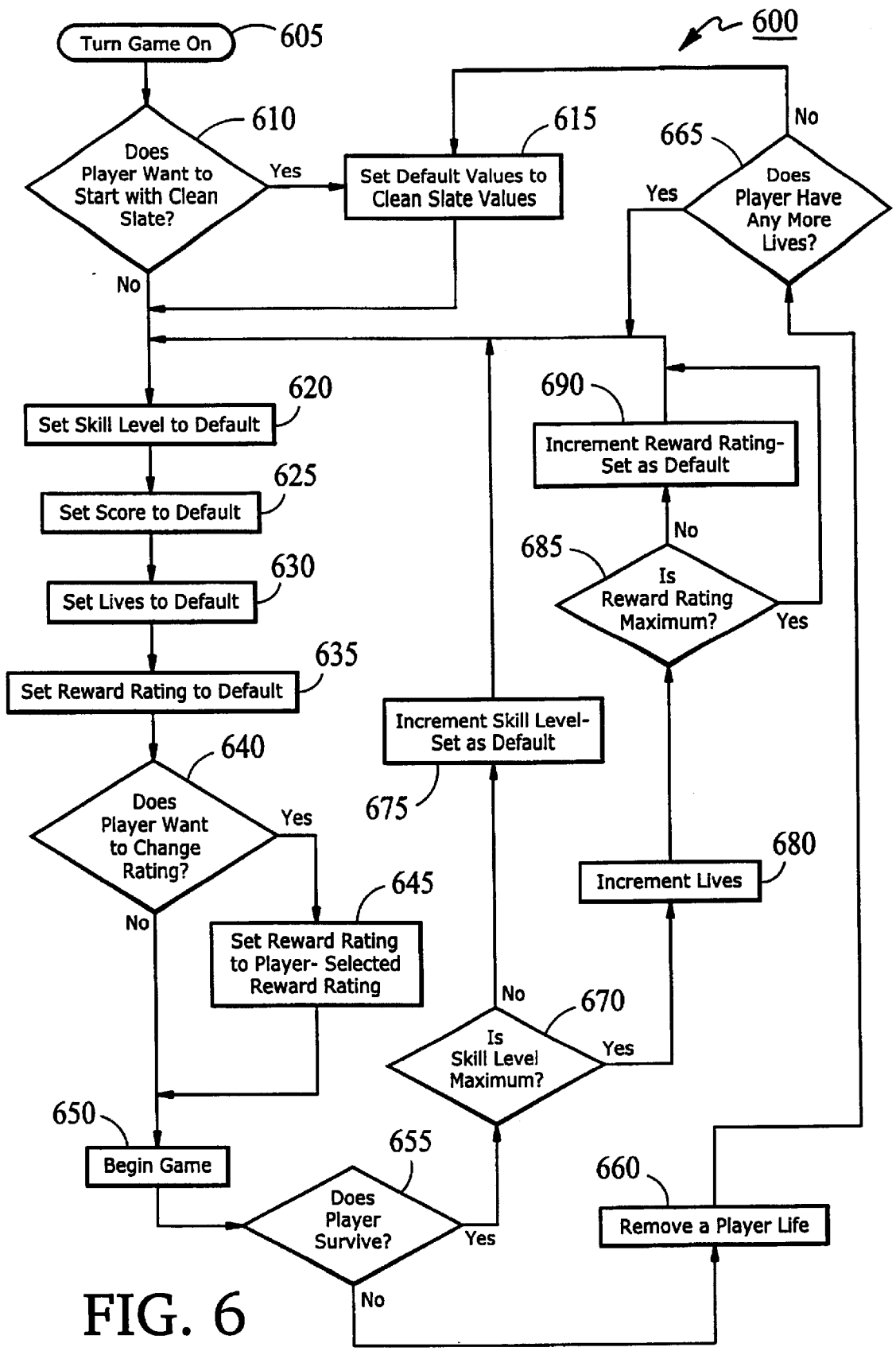
FIG. 6 is a flow chart of game play using the game of FIG. 1.

Referring also to FIG. 6, game play proceeds according to a procedure 600 that is initiated when the player presses the on button 305 to cause the controller 500 to turn on the game 100 (step 605). Game play 600 initially defaults to a demonstration mode which helps the player get acquainted with the game 100. The fire button 140 may be pressed at any time during demonstration mode to place the game 100 in game mode. Additionally, the reset button 300 may be pressed at any time to begin again. The sound button 310 may be pressed at any time during game play to turn off or turn on the sound from the speaker 560.

The controller 500 determines whether the player wants to start the game with a "clean slate" (step 610). A clean slate allows the player to start the game at the most basic game settings—reward rating of one, skill level of one, score at zero, and number of lives at three. The player presses and holds (for a short duration) the game button 315 to indicate that he or she wants a clean slate. The controller 500 then sets default values for reward rating, skill level, score, and number of lives to the clean slate values given above (step 615).

In any case, when the game button 315 is initially pressed the controller sets the skill level to a default value (step 620). The skill level ranges from one (easy play) to a maximum level $L_{max}$ (difficult play). As the player completes each skill level, an increasingly more difficult skill level is introduced. For example, difficulty may be altered by changing the speed of shots fired from enemy ships, the speed of the enemy ships, or the number of hits required to destroy an enemy ship. As the player advances to higher skill levels, the controller 500 stores the skill level in memory 570 until the game button 315 is pressed again and a new game begins. Then, when the new game begins, the controller 500 sets as the default skill level the skill level that the player reached in the last game played.

The controller 500 sets the score to a default value (step 625) when the game button 315 is initially pressed. When the player turns on the game for the first time, the default score is zero. As the player advances to higher skill ratings and levels, the controller 500 counts the score using the counter 580 and stores the score in memory 570 until the game button 315 is pressed again and a new game begins. Then, when the new game begins, the controller 500 sets as the default score the stored score that the player reached in the last game played.

The controller 500 sets the number of player lives to a default value (step 630) when the game button 315 is initially pressed. When the player turns on the game for the first time, the default number of lives is three. As the player advances to higher skill ratings and levels, the controller 500 stores the number of lives in memory 570 until the game button 315 is pressed again and a new game begins. Then, when the new game begins, the controller 500 sets as the default number of lives the number of lives that the player retained in the last game played. The minimum number of lives permitted to the player is one and if the player loses the last life during game play, the player begins the next game with a clean slate.

The controller 500 sets the reward rating to a default value (step 635) when the game button 315 is initially pressed. The reward rating ranges from one (low reward) to a maximum rating $R_{max}$ (high reward). As the player completes a reward rating, the controller 500 rewards the player with an extra life. Furthermore, as the player's reward rating increases, the controller rewards the player with relatively more points for destroying enemy ships. For example, at the highest reward rating the player is rewarded 100 points for destroying an enemy ship whereas at a lower reward rating (and same skill level) the player is rewarded only 50 points for destroying an enemy ship. As the player advances to higher reward ratings, the controller 500 stores the reward rating in memory 570 until the game button 315 is pressed again and a new game begins. Then, when the new game begins, the controller 500 sets the default reward rating to the stored reward rating the player reached in the last game played.

The player may, at this point, manually select another reward rating than the default reward rating by pressing the on button 305. If the controller 500 determines that the player wants to select another reward rating (step 640), then the controller sets the reward rating to the reward rating manually selected by the player (step 645).

When the player presses the fire button 140 at this point, the controller 500 begins the game using the default settings stored in memory 570 (step 650). If the controller 500 detects at any time that the player has left the game inactive for a preset duration (determined by the time given by clock 575), the controller 500 automatically shuts off the game.

During game play, the controller 500 determines if the player survives the game (step 655)—that is, the player was not destroyed by an enemy ship's fire. If the player were destroyed during the game by an enemy ship's fire, the controller removes a player's life (step 660) from the number of player lives and determines whether the player has any more lives available (step 665). If the player has no more lives left, the controller then sets the skill level, score, number of lives, and reward rating to the clean slate values at step 615. If the player does have more lives left, the controller advances to set all values to their default values (steps 620–645) before beginning the next game (step 650). For example, if the player has one more life after the controller removes a life at step 660, then the player begins with one life at the beginning of the next game (step 650)

If the player does survive through the current game, the controller determines whether the skill level reached by the player is the maximum skill level $L_{max}$ (step 670). If the skill level reached by the player is not the maximum skill level, the controller increments the skill level and saves the new skill level as the default skill level (step 675) before setting default skill level, default score, default number of lives and default reward rating (steps 620–645) for the next game (step 650).

If the skill level reached by the player is the maximum skill level, the controller rewards the player with an extra life (step 680) and determines whether the reward rating reached is the maximum reward rating $R_{max}$ (step 685). If the reward rating reached is not the maximum reward rating, the controller rewards the player by incrementing the reward rating (step 690). In either case, the controller then sets default values (step 620–645) to correspond to those values from the previous game before beginning the next game (step 650).

Figure 7:
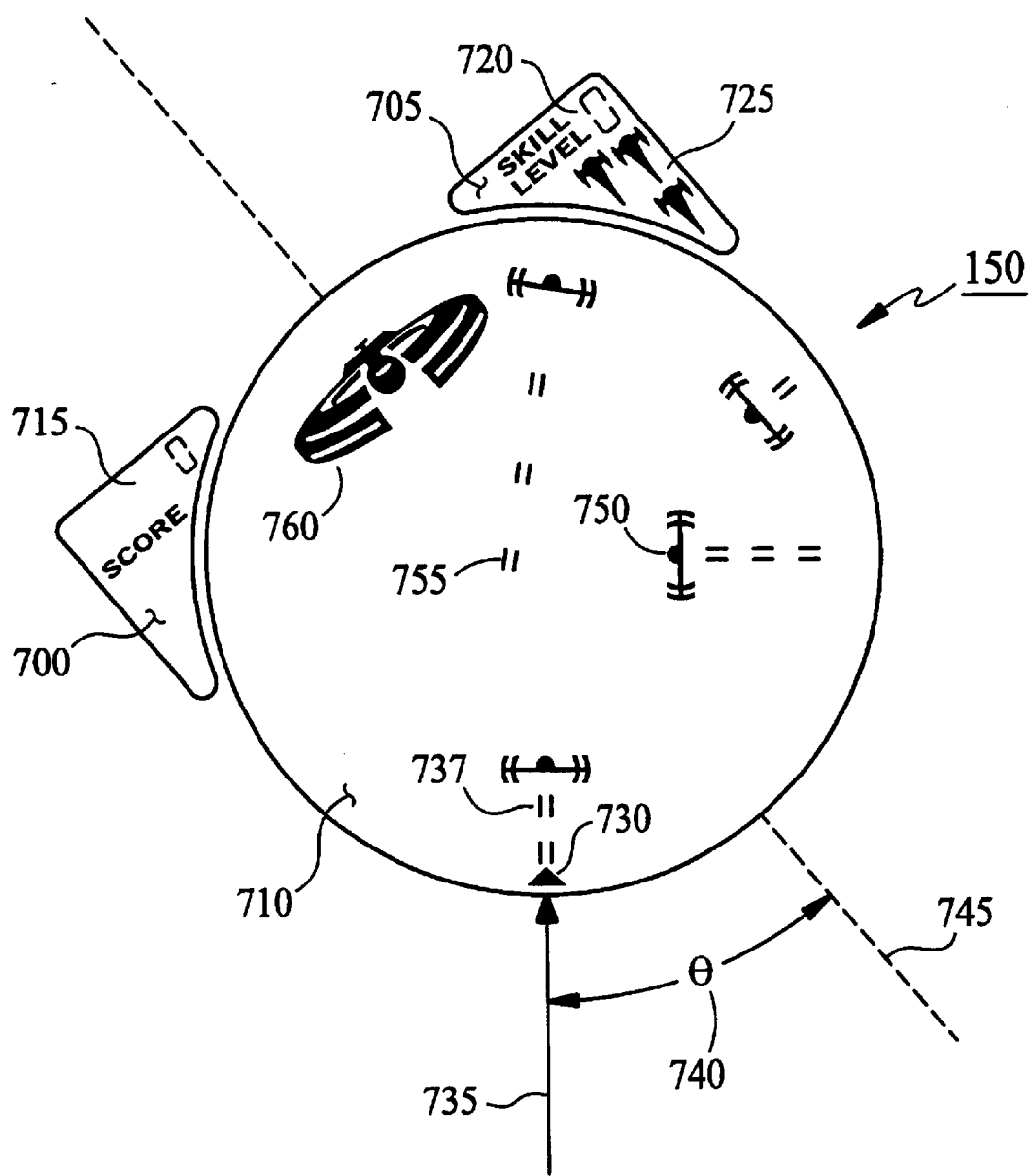
FIGS. 7–9, 10A and 10B are details of a display screen of the game of FIG. 1.

Referring also to FIG. 7, the LCD screen 150 displays three smaller screens—a score screen 700, a settings screen 705, and a pilot's eye screen 710. The controller 500 displays in the score screen 700 a current score 715 of the player, that is, total current points accumulated by the player. If the player presses the score button 320 before the game begins at step 650, the controller 500 displays in the score screen 700 a best score reached by any previous player.

The controller 500 displays in the settings screen 705 the default skill level 720 of the player. Alternately, when the controller 500 determines that the player wants to change the reward rating at step 640, the controller displays in the settings screen 705 the default or selected reward rating. The controller 500 further displays in the settings screen 705 the number of lives that remain for the player, where a life is represented by an icon 725 of the housing 105. When the housing 105 is designed as a fighter ship, the icon 725 resembles a fighter ship. Because of the limited amount of space on the LCD screen 150, the number of icons displayed in the settings screen 705 may be limited to, for example, three.

The controller 500 displays in the pilot's eye screen 710 an icon 730 (depicted as a darkened triangle) of the fighter ship along a player's line of sight (depicted as solid arrow 735). When the player presses the fire button 140 after the controller 500 begins the game at step 650, the controller 500 displays fired shots 737 from the fighter ship icon 730 in the pilot's eye screen 710.

As the player rotates the viewer 125 by an angle 740, the fighter ship icon 730 rotates through an angle-relative to a position (depicted as dashed line 745) of the viewer 125. Therefore, the fighter ship icon 730 remains stationary with respect to the player's line of sight 735. Every other object displayed in the pilot's eye screen 710 remains stationary with respect to the viewer 125, but rotates along with the viewer through the angle relative to the player's line of sight 735. In this way, the player experiences a feeling that she or he is rotating during the game to avoid and/or destroy enemy objects on the LCD screen.

The controller 500 displays in the pilot's eye screen 710 various enemy ships 750 that fire destructive shots 755 at the fighter ship 730. The controller 500 also displays a control ship 760 that remains inactive for a beginning duration of a game. If the player's fighter ship 730 survives through the beginning duration (that is, the ship 730 does not get struck by shots 755), then the controller 500 activates the control ship 760 and advances it into the pilot's eye screen 710. When this happens, the control ship 760 bombards the player's fighter ship 730 with destructive fire shots.

Figure 8:
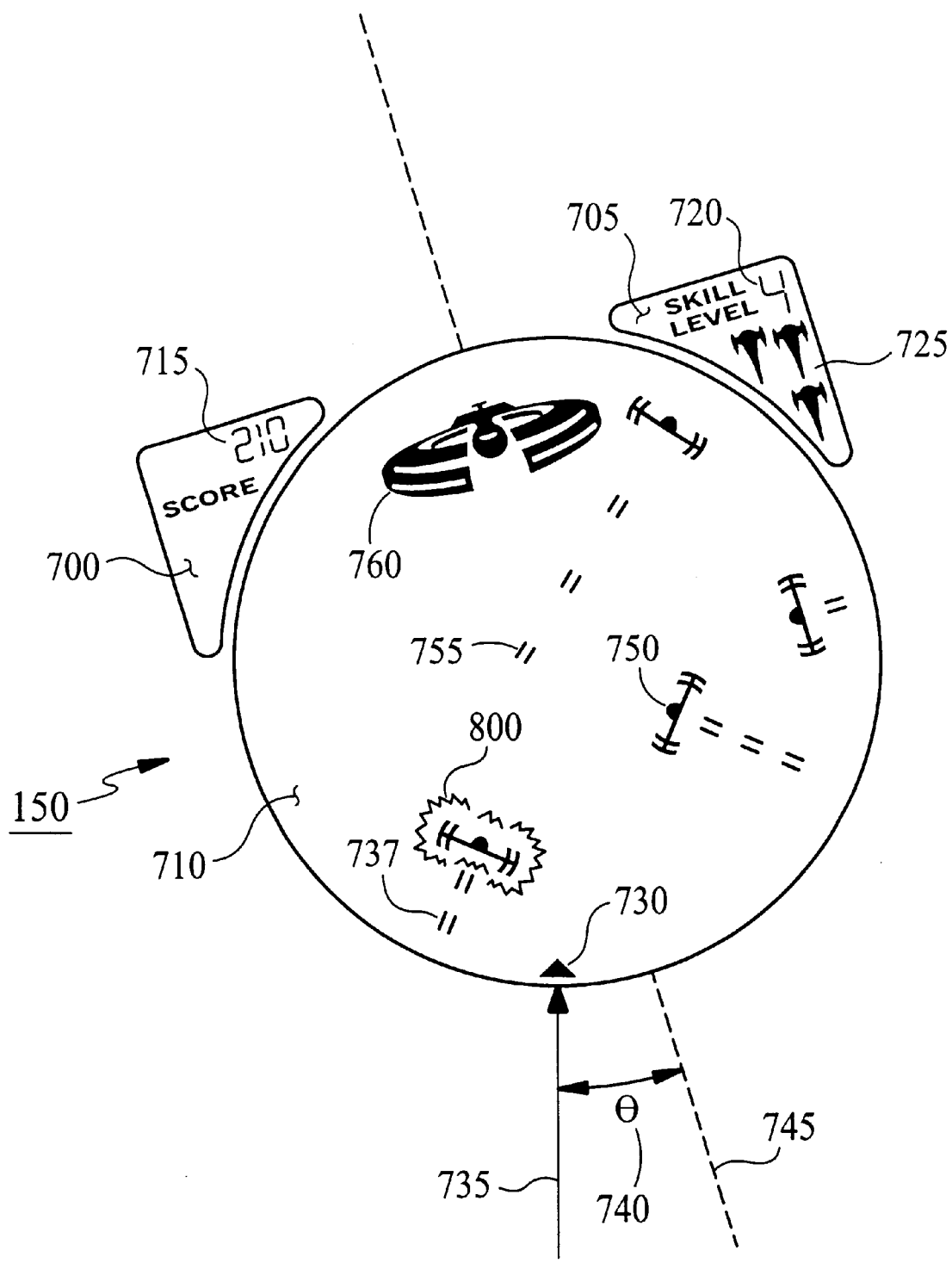

Referring also to FIG. 8, when the game begins at step 650, the player rotates the viewer 125 to avoid enemy ship's fire 755 and to destroy enemy ships with fire shots 737. As shown in the score screen 700, the player has accumulated 210 total points by destroying enemy ships. Furthermore, the player has three lives as indicated by three fighter ship icons 725 in the settings screen 705. The game is still in the beginning duration, so the control ship 760 is inactive and rests at the top of the pilot's eye screen 710. The player's fighter ship 730 has just fired some shots 737 at an incoming enemy ship 750. If the fired shots 737 strike the enemy ship 750 (as they do in FIG. 8), the controller indicates this to the player by illuminating 800 the destroyed enemy ship.

When the player presses the fire button 140, the fired shot from the player's fighter ship will destroy an incoming enemy ship if the fighter ship is directly in line with the incoming enemy ship at the time the player presses the fire button 140. The player's fighter ship 730 may get hit by an incoming shot fired from a destroyed enemy ship because the ship's incoming shots are not destroyed with the destruction of the ship. Because the player's fighter ship fires shots that travel in straight lines, the player may move the fighter ship out of the way of an incoming enemy ship after firing a shot at that ship, thus avoiding incoming fire from the targeted enemy ship. This maneuver is shown in FIG. 8 because the destroyed enemy ship 800 is not in line with the fighter ship 730.

Figure 9:
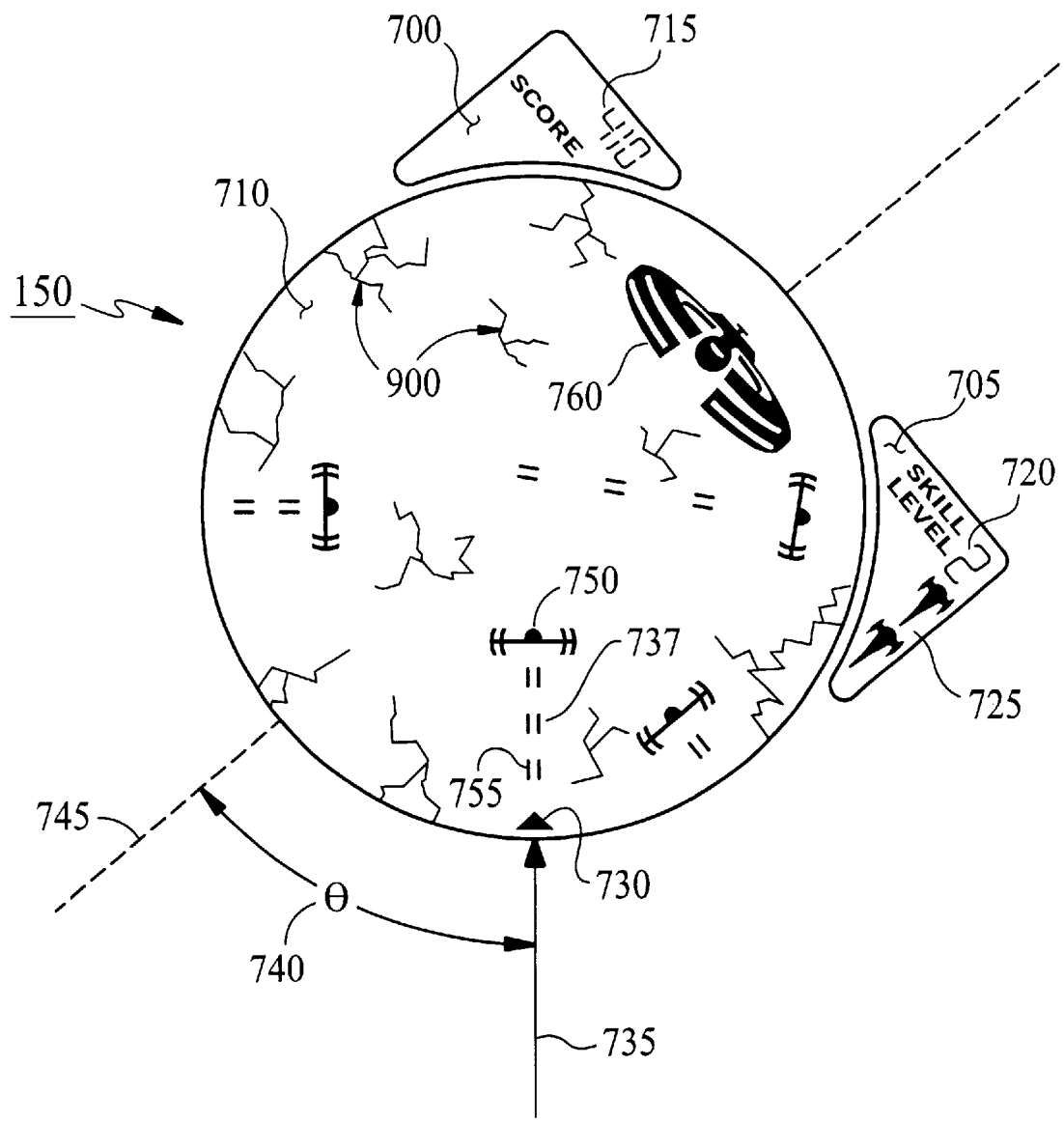

Referring to FIG. 9, when the player's fighter ship 730 is struck by the enemy ship's fire 755, the game halts and the controller displays a cracked cockpit window, represented by squiggly lines 900 throughout the LCD screen 710. As shown in the score screen 700, the player has accumulated 410 total points before the game was halted. Furthermore, the player loses a life (corresponding to step 660 in FIG. 6) and now has only two lives. This is indicated by the two fighter ship icons 725 in the settings screen 705. Before the fighter ship was struck, the game was still in the beginning duration because the control ship 760 was inactive at the top of the pilot's eye screen 710.

Figure 10A:
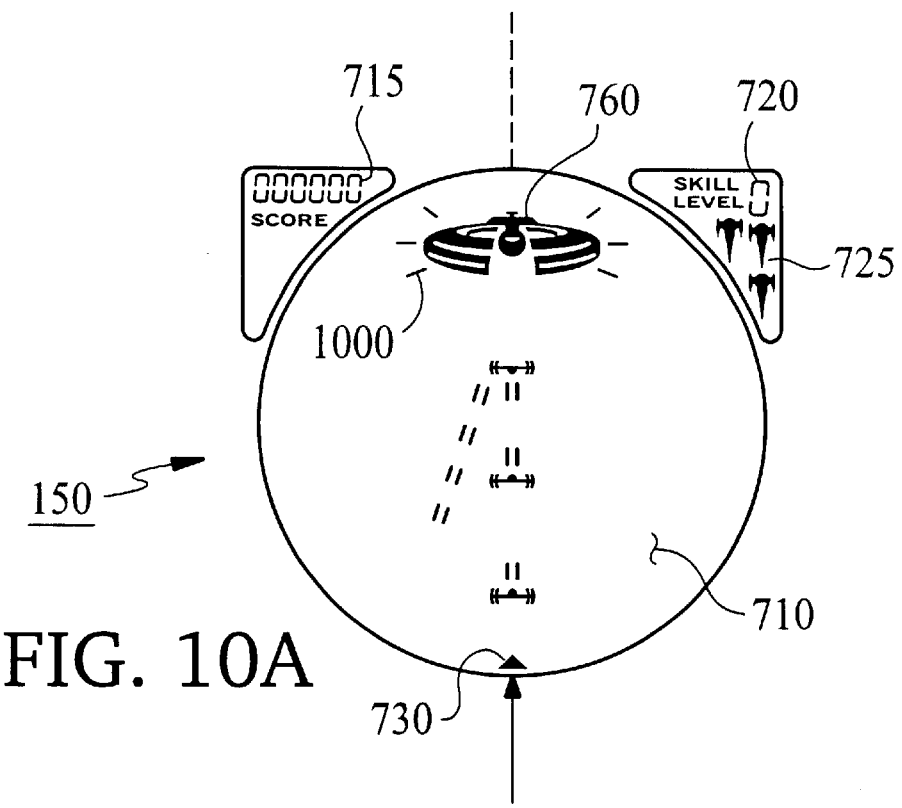
Figure 10B:
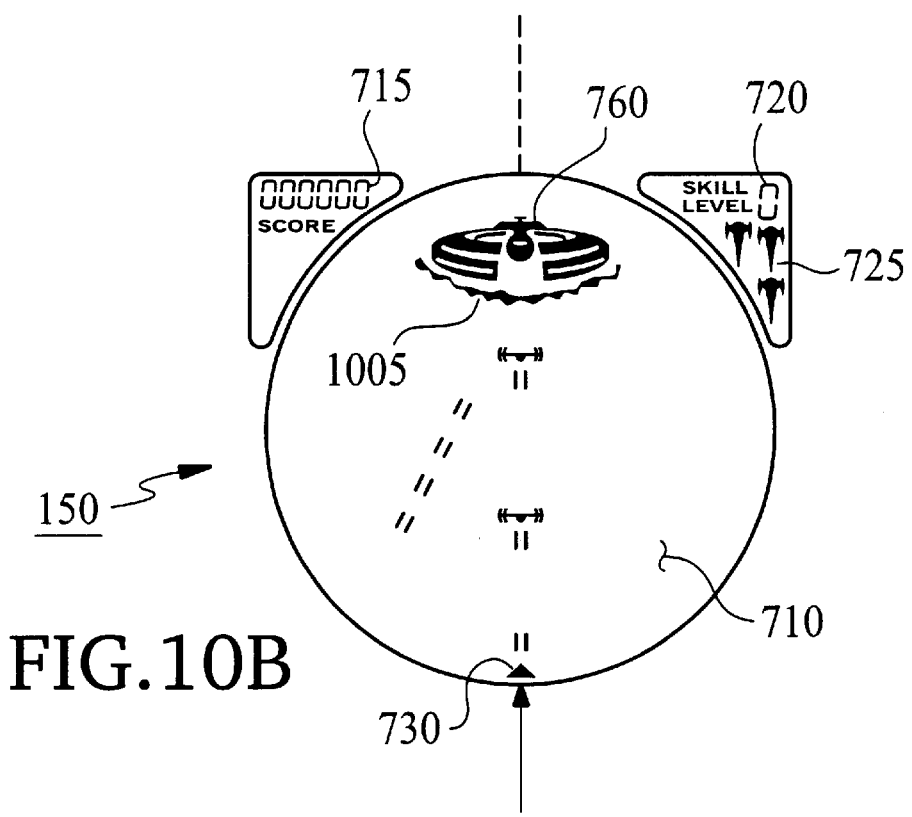

Referring to FIGS. 10A and 10B, after the beginning duration has expired and if the player's fighter ship survives incoming fire from the enemy ships, the control ship 760 begins to bombard the fighter ship with fired shots. At this time, the control ship 760 becomes larger in the pilot's eye screen 710 to signal to the player that the beginning duration has ended and the control ship 760 is active.

Unlike the regular enemy ships 750, the control ship 760 is not always vulnerable to shots fired from the fighter ship 730. For example, in FIG. 10A, the control ship 760 is vulnerable and the controller causes it to blink once to notify the player of that vulnerability (blinking is represented by radiating lines 1000 in FIG. 10A). However, in FIG. 10B, the control ship 760 is protected by an energy shield 1005.

When the energy shield is down, the player gets one chance to destroy the control ship 760 by firing a direct hit from the fighter ship up the middle 1010 of the control ship 760. The player may do this when the fighter ship is positioned at one of several preselected firing positions. Furthermore, while targeting the control ship the player must concurrently maneuver the fighter ship to avoid the control ship's incoming fire. If the player destroys the control ship, then the controller rewards the player with a larger number of points than are normally rewarded at that skill level for destroying an enemy ship 750. If the control ship strikes the fighter ship, the player loses a life (step 660 in FIG. 6).

In FIG. 10B, the control ship 760 is protected by an energy shield 1005 that must first be destroyed by the player before the fighter ship even has access to the control ship. Once the shield 1005 is destroyed, the player may destroy the control ship 760 by firing shots 737 from the fighter ship 730. To vary the difficulty of the skill levels the controller is configured to only display the energy shield 1005 when the skill level is above a preset skill level. The controller also is configured to display a relatively larger control ship 760 for those skill levels above the preset skill level.

The number of times the player must strike the energy shield 1005 before it is destroyed increases with skill level. Therefore, it becomes more difficult to destroy the control ship at higher skill levels.

Other implementations also are contemplated. For example, the controller may reward the player with a greater number of points if the player destroys an enemy ship that is relatively close to the fighter ship. The player also may be given a maximum number of shots that may be fired at enemy ships during a game.

The game may be configured with no skill levels and/or no reward ratings. Likewise, the number of lives accumulated by the player may be unlimited. Fired shots may be displayed in a unique shape when emitted from the fighter ship. This would help the player to see incoming shots more clearly and distinguish them from shots fired from the player's fighter ship.

Other embodiments are within the scope of the following claims.

What is claimed is:

1. An electronic game comprising:
a housing;
a display mounted on the housing and rotatable relative to the housing; and
a processor connected to control the display and programmed to cause the display to display an element that remains stationary relative to the housing when the display is rotated relative to the housing.

2. The game of claim 1, wherein the housing is shaped like a vehicle.

3. The game of claim 1, wherein the housing comprises a handle that enables a player to hold the housing using one hand and rotate the display using the other hand.

4. The game of claim 1, wherein the display comprises a liquid crystal display (LCD).

5. The game of claim 1, wherein the housing comprises an end that couples to a player's chest.

6. The game of claim 5, wherein the coupled end of the housing comprises a softer material to protect the player's chest.

7. The game of claim 1, wherein the processor causes the display to display a play zone that includes the element.

8. The game of claim 7, wherein the play zone includes one or more zone elements, the zone elements rotating as the display is rotated relative to the housing.

9. The game of claim 8, wherein the zone elements comprise objects that move toward a perimeter of the play zone, and fired objects.

10. The game of claim 9, further comprising an input device mounted in the housing to receive input from a player.

11. The game of claim 10, wherein the processor is connected to the input device.

12. The game of claim 11, wherein the fired objects emanate from the perimeter-moving objects and move toward the play zone perimeter.

13. The game of claim 12, wherein when a fired object strikes the stationary element, the stationary element is destroyed.

14. The game of claim 13, further comprising a speaker connected to and controlled by the processor, wherein the processor is programmed to play one or more sounds from the speaker when the stationary element is destroyed.

15. The game of claim 13, wherein the processor is programmed to alter the play zone when the stationary element is destroyed.

16. The game of claim 13, wherein the processor is programmed to display a game update that provides game information to the player.

17. The game of claim 16, wherein the processor is programmed to permit the game update to display a value associated with a number of destroyed stationary elements.

18. The game of claim 11, wherein the fired objects emanate from the stationary element in response to signals from the input device.

19. The game of claim 18, wherein when a fired object strikes a zone element, the zone element is destroyed.

20. The game of claim 19, further comprising a speaker connected to and controlled by the processor, wherein the processor is programmed to play one or more sounds from the speaker when a zone element is destroyed.

21. The game of claim 20, further comprising a speaker connected to and controlled by the processor, wherein the processor is programmed to play one or more sounds from the speaker when a zone element is destroyed.

22. The game of claim 21, wherein the processor is programmed to display a game update that displays a score associated with a number of destroyed zone elements.

23. An electronic game comprising:
   a housing that includes a handle at the front of the housing and a soft end at the back of the housing, the soft end coupling to a player's chest;
   a display mounted on the front of the housing and rotatable relative to the housing;
   an input device mounted on the handle to receive input from a player; and
   a processor connected to control the display and receive input from the input device, and programmed to cause the display to:
      display an element that remains stationary relative to the housing when the player rotates the display relative to the housing, and
      display a play zone that includes the stationary element and zone elements, the zone elements rotating as the player rotates the display, wherein:
   the zone elements include objects that move toward a perimeter of the play zone and fired objects,
   the fired objects emanate from the perimeter-moving objects and the fired object emanate from the stationary element in response to signals from the input device,
   when a fired object strikes the stationary element, the stationary element is destroyed, and
   when a fired object strikes a zone element, the zone element is destroyed.

* * * * *